United States Patent [19]

Van Riemsdijk et al.

[11] 3,857,182
[45] Dec. 31, 1974

[54] APPARATUS FOR INSPECTION PURPOSES, INTENDED TO BE MOVED THROUGH A PIPELINE

[75] Inventors: Arnoldus J. Van Riemsdijk; Waldo van den Berg, both of Amsterdam, Netherlands

[73] Assignee: Shell Oil Company, New York, N.Y.

[22] Filed: Sept. 6, 1973

[21] Appl. No.: 394,903

[30] Foreign Application Priority Data
Oct. 30, 1972  Netherlands...................... 7214646

[52] U.S. Cl. ............................................ 33/141 G
[51] Int. Cl. ...................... G01b 3/12, G01m 3/28
[58] Field of Search...... 33/134, 142, 141 G, 141 E, 33/141 R, 141 B, 141.5; 324/161

[56] References Cited
UNITED STATES PATENTS

| | | | |
|---|---|---|---|
| 3,134,175 | 5/1964 | Potts.................................. | 33/141 G |
| 3,500,190 | 3/1970 | Michon.............................. | 324/161 |
| 3,769,711 | 11/1973 | Flournoy et al. ................. | 33/141 G |

*Primary Examiner*—Harry N. Haroian

[57] ABSTRACT

A pipeline leak detecting instrument pig designed for travel through pipelines and having improved distance measuring means. The pig is provided with at least two distance measuring wheels and a circuit means for selecting the measuring wheel that provides the highest reading.

5 Claims, 10 Drawing Figures

3,857,182

APPARATUS FOR INSPECTION PURPOSES, INTENDED TO BE MOVED THROUGH A PIPELINE

BACKGROUND OF THE INVENTION

The invention relates to a pipeline inspection apparatus which is transported through the pipeline by fluid flow. Apparatuses of this type may consist of an enclosed housing that is provided with two circular arrays of bearing wheels, at least three wheels being present in each array. Also, one or two collars or pistons may be present which have a diameter approximately equal to or somewhat smaller than the internal diameter of the pipeline so that fluid flow will transport the apparatus through the pipeline. Contained in the enclosed housing is the equipment required for the inspection of the pipeline. This may be, for instance, equipment for detecting leaks, for measuring the wall thickness, corrosion or fouling, or for temperature measurement. The observations are automatically recorded and after completion of the journey through the pipeline can be read or presented in a graphical form.

As a rule it is necessary to know the location where particular conditions were observed. For instance, if the apparatus is used for the detection of leaks, the location of the leak should be known with an accuracy within, for instance, a few meters, in order that the place where a repair has to be carried out can be readily found. A known method for the determination of the distance covered by an apparatus of this type consists of a special wheel that is pressed against the inside of the wall of the pipeline, the number of revolutions of the wheel being recorded. U.S. Pat. No. 3,732,625 issued to B. Vernooy, May 15, 1973, discloses a pipeline inspection apparatus of this type.

BRIEF SUMMARY OF THE DISCLOSURE

The invention therefore relates to an apparatus which for inspection purposes can be moved through a pipeline, comprising an enclosed housing that is provided with two circular arrays of bearing wheels. Each array has at least three wheels and at least two bearing wheels are equipped with signal transmitters which supply a signal for each revolution. The two bearing wheels equipped with transmitters are referred to as measuring wheels and act as counting wheels for the purpose of measuring the distance travelled by the apparatus to any point in the pipeline. The number of bearing wheels that are equipped so as to serve as counting wheels as well as the positions thereof have been chosen so that in any position of the apparatus in the pipeline at least two measuring wheels are in contact with the inner wall of the pipeline. The apparatus includes processing equipment for the determination of the distance covered from the signals received from the signal transmitters on the measuring wheels and for recording that distance.

Thus, according to the invention use is made of the bearing wheels and at least two of these wheels are running continuously along the inner wall of the pipeline. The invention concerns an apparatus which in the pipeline is supported exclusively by bearing wheels, so that there will always be wheels which bear a load and thus will rotate. If the wheels are properly constructed, those load-bearing wheels will not skid. It has already been mentioned that the apparatus may also be provided with one or more collars or pistons. These collars do not have a bearing function, but serve exclusively to ensure that the apparatus is transported with the flow of the medium in the pipeline. A special construction for pressing a counting wheel against the wall is not required. Owing to this, and because at least two bearing wheels are equipped so as to serve also as measuring wheels, the reliability of the distance measurement is greatly improved.

Under normal operating conditions there will therefore be at least two measuring wheels which supply signals and the processing equipment should be capable of deriving from these signals the correct distance covered. For this purpose, several different procedures are available and the invention furthermore provides for the selection of these procedures and adaptation thereof to particular conditions.

BRIEF DESCRIPTION OF THE DRAWINGS

The invention will be more easily understood from the following detailed description when taken in conjunction with the attached drawings in which.

DESCRIPTION OF PREFERRED EMBODIMENT

Figure 1:
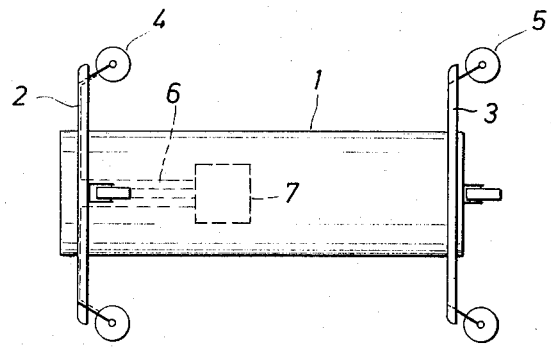
FIG. 1 is an elevation view of an apparatus constructed according to this invention.

Ideally, the center line of the pig would always coincide with that of the pipeline and all wheels would be in contact with the inner wall of the pipeline. These conditions are not always met, because the cross section of the pipeline is not the same in all places and, moreover, may deviate from the truly circular shape. These difficulties can be overcome by attaching the wheels to the housing of the apparatus by means of springs. This, however, has the disadvantage that the construction becomes complicated. It is also possible for the diameter of a circular array of wheels to be made smaller but this results in only some of the bearing wheels being in contact at the enlarged sections of the pipeline.

Naturally, in the case of all the bearing wheels also being measuring wheels the condition that at lest two measuring wheels being in contact during the travel through the pipeline is met. The costs of this solution, however, are unecessarily high; for, it is possible for the bearing wheels to be equipped to serve as measuring wheels to be selected in such a way that at least two will be rolling along the pipe wall. This is achieved, for instance, if all the wheels in one circular array are also measuring wheels. Owing to the elongated shape of the apparatus at least some of the wheels in each circular array will be in contact with the pipe wall, irrespective of the position of the apparatus in the pipeline. These may be the lowermost wheels or the uppermost, depending on the relative weight of the apparatus in the medium in the pipeline.

It is also possible for measuring wheels to be present in each circular array, in which case there should be at least so many of them that at most one non-measuring bearing wheel is present between two measuring wheels. Here again, always at least two measuring wheels should be in contact with the pipe wall.

It is possible that the center of gravity of an apparatus will not lie on the center line thereof. In that case, with an apparatus whose specific gravity is higher than that of the medium to be pumped through the pipeline, in each circular array at least one measuring hweel may be present in or near the plane through the center line and the center of gravity on the side where the center of gravity is located. With an apparatus whose specific gravity is lower than that of the medium to be pumped through the pipeline, in each circular array at least one measuring wheel may be present in or near the plane through the center line and the center of gravity on the side where the center of gravity is not located. In both cases, the apparatus will orient itself so that the center of gravity is in the lowermost position or, if the apparatus is already in the position where this condition is met it will remain in that position. It will then be known beforehand which bearing wheels will in any case be pressed against the wall of the pipeline, of which wheels at least two can be equipped so as to serve as measuring wheels. If necessary, a separate weight may be used to control the eccentricity of the center of gravity of the apparatus as well as the weight of the apparatus.

Another method of selecting measuring wheels whose signals are processed consists in the installation of a ring-shaped switch in the apparatus in a plane perpendicular to the center line thereof. The switch can connect the uppermost measuring wheels to the signal processing equipment if the specific gravity of the apparatus is lower than that of the medium to be pumped through the pipeline or the lowermost measuring wheels if the specific gravity of the apparatus is higher than that of the medium. This is of importance particularly if the position of the apparatus relative to the pipeline is of no significant importance, and this method can be applied if all the wheels in a circular array are measuring wheels or if the measuring wheels are distributed over both circular arrays of wheels.

By providing the measuring wheels with wheel pressure meters which are connected to a switch device the measuring wheel having the highest wheel pressures of a pair will be connected to the signal processing equipment. This ensures that those measuring wheels are switched on which are load-bearing and, consequently, are active.

All the wheels may be coupled in such a way that they have the same speed of rotation. Non-load-bearing wheels will then also rotate. In this case any wheel may serve as a measuring wheel. Coupling of wheels may be effected by mechanical or electric means. However, it calls for extensive measures which will only be taken in special cases.

Each measuring wheel may be equipped with two signal transmitters which are placed next to each other so that the distance between them is less than 180°. The signal tansmitters are connected to a device which derives a signal related to the direction of rotation. This information is of importance if a pipeline contains sections having a steep slope. If the pumping temporarily stops and if the apparatus is then in a steep section, the apparatus may start to move backwards. This movement is measured and subtractd from the mesurement.

The signal transmitters on the measuring wheels may operate mechanically, electrically, electronically or magnetically. There is a preference for magnetic signal transmitters, in an arrangement where a permanent magnet is installed in the wheel which magnet actuates a magnetic reed relay when passing that relay. A suitable electronic signal transmitter consists of a high-frequency oscillating circuit, rigidly mounted adjacent to the wheel, which becomes detuned or damped upon a piece of metal being passed. Both systems have the advantage that no mechanical contact is required for the transmission of a signal. Two signal transmitters on one measuring wheel can be realized by rigidly mounting two coils besides the wheel in question at the desired distance from each other, that is at a distance of less than 180°.

The processing equipment intended to determine the distance covered from the signals from the signal transmitters and to record that distance. The processing equipment is arranged so that the signals from that counting wheel whose speed of rotation is the highest are counted. If one of the wheels rotates at a higher speed than the other wheel(s), then it is certain that that other wheel, or those other wheels, are, skidding and the signals should not be counted. If all the counting wheels are rotating at the same speed, then the signals from one of those wheels are counted.

An auctioneering or switch circuit suitable for selecting the measuring wheel that is rotating at the highest speed comprises for each measuring wheel a gate connected to the signal transmitter of the measuring wheel in question. In addition, for each measuring wheel an auxiliary counter, which counters are connected via switch elements to the inputs for opening or closing the gates concerned. The switch elements can open only one of the gates, namely that one which is connected to the signal transmitter which causes its auxiliary counter to go up at the highest rate, the signals being allowed to pass through the gate concerned being counted by a main counter. In this arrangement, reset connections are present which reset the auxiliary counters to zero as soon as a signal is counted by the main counter. The auxiliary counters may consist of shift registers.

Figure 2:
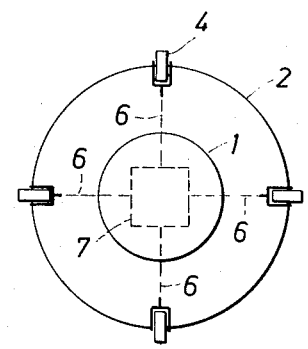
FIG. 2 is an end view of the apparatus shown in FIG. 1.

Referring to FIGS. 1 and 2, there is shown an apparatus for inspecting a pipeline and constructed according to this invention. The enclosed casing 1 is provided with two collars or pistons 2 and 3. To each of these collars four bearing wheels are attached to form two circular arrays 4 and 5. The collars 2 and 3 have a diameter which is slightly smaller than the internal diameter of the pipeline. The bearing wheels can all travel along the inner wall of the pipeline. The bearing wheels may also be attached to the housing 1 in another way. The collars 2 and 3 may have a different shape or may even be entirely absent.

As shown, each circular array comprises four bearing wheels and all the wheels in one circular array 4 are also measuring wheels. The signal transmitters hereof are all connected by wires 6 to the processing equipment 7 by which the distance covered is determined from the signals supplied. At least two measuring wheels will always be active, that is to say that they will be rolling along the inner wall of the pipeline.

Figure 3:
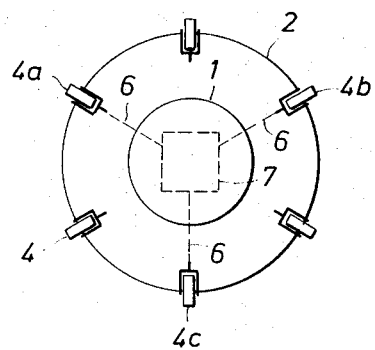
FIGS. 3—8 are end views of modified forms of the apparatus shown in FIG. 1.
Figure 4:
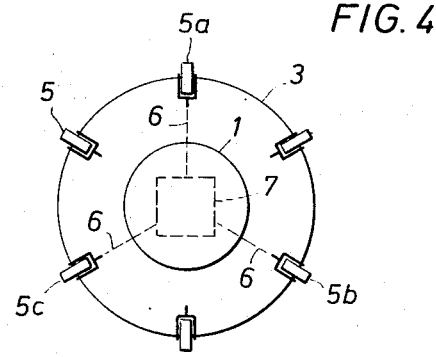

In FIGS. 3 and 4, views are given of collars 2 and 3, with circular arrays 4 and 5 having six bearing wheels. The bearing wheels 4a, 4b, 4c and 5a, 5b and 5c also serve as measuring wheels and at least two measuring wheels will always be active.

Figure 5:
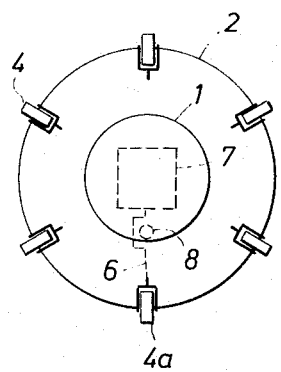
Figure 6:
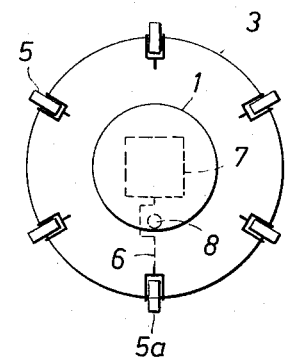

In FIGS. 5 and 6, representing circlar arrays 4 and 5 of bearing wheels attached to the housing 1, the dot 8 indicates that the center of gravity of the entire apparatus is eccentric. As shown, the specific gravity of the apparatus is higher than that of the medium in the pipeline, so that the lower-most bearing wheels 4a and 5a are in contact with the wall of the pipeline. These are connected to the processing equipment 7. If the specific gravity of the apparatus is lower than that of the medium, then the uppermost bearing wheels would serve as measuring wheels.

Figure 7:
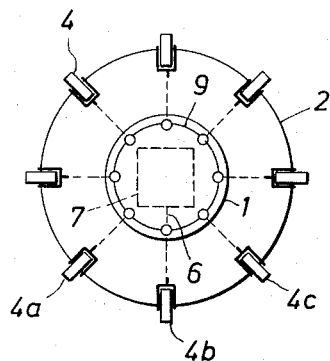

In FIG. 7 a ring-shaped switch 9 is present and all the bearing wheels of the circular array 4 are measuring wheels and the signal transmiters are all connected to the ring-shaped switch 9. This is so arranged that the three lowermost counting wheels 4a, 4b and 4c are connected to the processing equipment 7. If the apparatus rotates about its center line, other counting wheels are activated, always the lowermost ones. The ring-shaped switch may comprise mercury switches which close when they are rotated to the lowest position in the pipeline.

Figure 8:
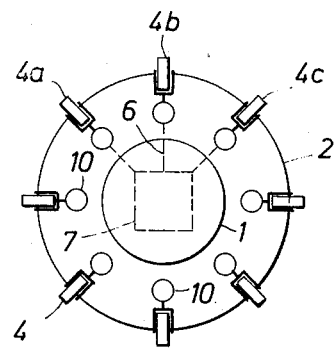

In FIG. 8 each counting wheel of the circular array 4 is provided with a wheel pressure meter 10. In this case it is supposed that the specific gravity of the apparatus is lower than that of the medium so that the counting wheels bearing the highest load are in the uppermost position. Three of these — the wheels 4a, 4b and 4c — are switched on by a circular switch similar to switch 9 shown in FIG. 7.

Figure 9:
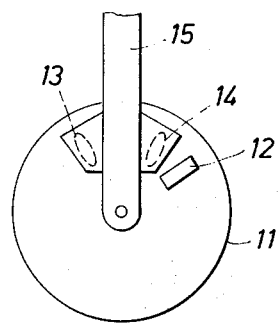
FIG. 9 is an enlarged view of one of the measuring wheels shown in the above figures.

A counting wheel 11, shown in FIG. 9 may be provided with a magnet 12 which when the wheel rotates passes two coils 13 and 14. The coils 13 and 14 are attached in the support 15 of the wheel or to the housing.

The order in which the signals are received from the coils 13 and 14 depends on the direction of rotation of the wheel 11 and direction in which the apparatus is moving can be derived from the signals.

Figure 10:
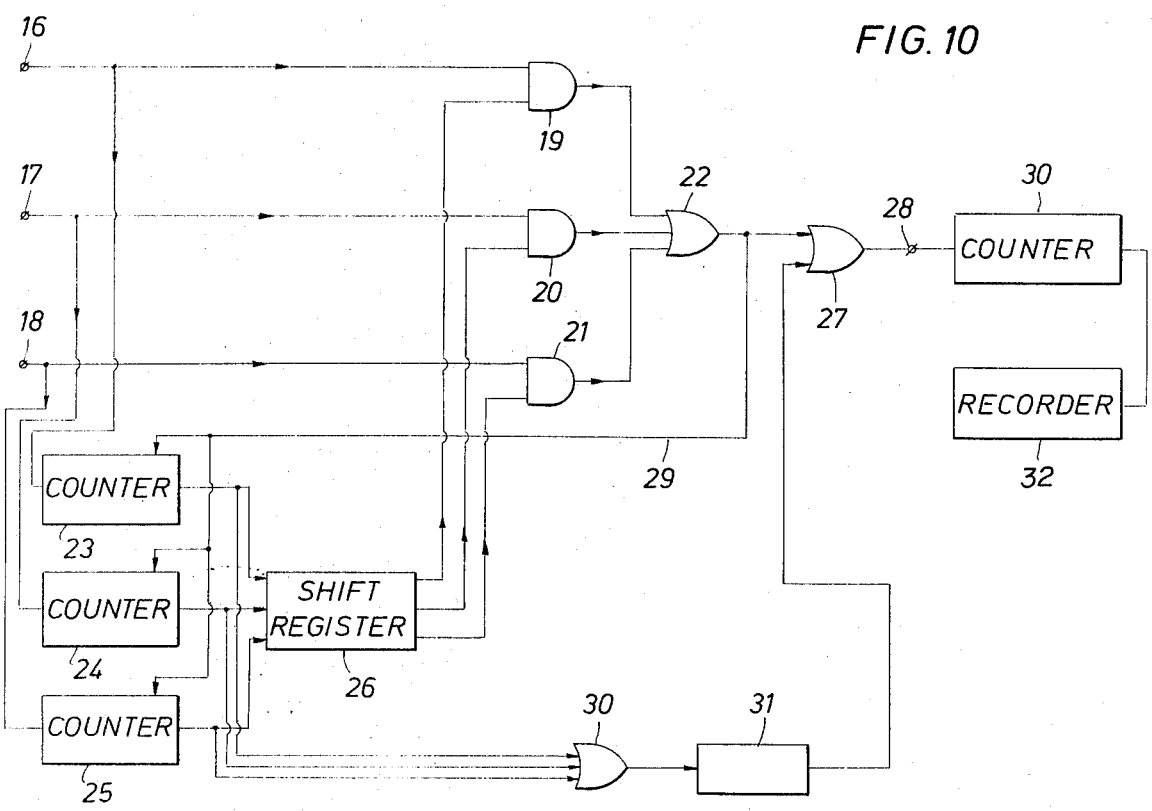
FIG. 10 is a block diagram of a circuit for processing the signals from the measuring wheels.

The equipment for processing the signals from the counting wheels may comprise the circuit shown in FIG. 10. Here signals from three measuring wheels are represented although the number can be increased to any convenient number.

The signals from the measuring wheels enter at 16, 17 and 18 and each is coupled to a gate of the "and" type 19, 20 and 21 respectively. The outputs from the gates are connected to a gate 22 of the "or" type. The signals entering at 16, 17 and 18 are also supplied to the auxiliary counters or shift registers 23, 24 and 25 whose outputs are connected to a switch memory system 26. If one of the auxiliary counters, for instance counter 24, has counted two pulses, then the switch memory system 26 is set in the position in which only the signals entering at 17 are allowed to pass. The switch memory 26 may comprise a series of gates that respond to the signals from counters 23, 24 and 25 to open the appropriate gate 19, 20 or 21. Gate 20 then opens, the gates 19 and 21 remain closed because each of them receives signals only at one input. The or gate 22 allows the signals from 17 to pass to the or gate 27. If this or gate receives no other signals, then the signals from 17 go to the main counter 30, connected to the output 28.

Each pulse from or gate 22 clears the auxiliary counters 23, 24 and 25 again via the reset line 29. If a measuring wheel other than that connected to 17 rotates at a higher speed, then the auxiliary counter concerned will count two pulses before a reset action takes place. Then in the switch memory system 26 the gate belonging to that high-speed counting wheel is opened and the other one is closed.

In the action of switching to another and gate a pulse is lost to the main counter. This may be negligible if switch-over actions are rare. If one wishes that pulse still be counted then this may be done by an or gate 30 and a delay 31, connected to gate 27. The delay 31 ensures that the "lost" pulse does not arrive at the or gate 27 simultaneously with a pulse from 16, 17 and 18. Otherwisee that pulse would not be counted.

The main counter, to be connected to 28, can count the number of incoming pulses and by means of a scaler reduce the number to a convenient code for the distance covered. Several different recording procedures may be used, such as printing or recording on a magnetic tape in a recorder 32.

The switch memory system 26 ensures that only one output is open while the other outputs are blocked. This can be accomplished by a series of flip-flop circuits.

We claim as our invention:

1. In a pipeline leak detecting instrument of the type wherein an instrument is transported through the pipeline by fluid flow and the distance the pig travels is determined by a measuring wheel that contacts the wall of the pipeline and produces an electrical signal related to the rotation of the wheel, the improvement comprising:

at least two measuring wheels, said wheels being disposed on opposite sides of said pig; and an auctioneering circuit, said circuit being coupled to both of said measuring wheels to select for rocording on a single recorder the signal from the measuring wheel producing the largest signal.

2. The apparatus of claim 1 in which the pig is provided with two circular arrays of bearing wheels, at least two of the bearing wheels being measuring wheels, the measuring wheels being disposed on opposite sides of said pig.

3. The apparatus of claim 2 in which the circular arrays of bearing wheels are located at opposite ends of said pig and each array has at least four bearing wheels equally spaced around the periphery of the array.

4. The apparatus of claim 1 wherein said auctioneering circuit comprises means disposed on each measuring wheel for measuring the pressure between the wheel and the wall of the pipeline and a switch means for coupling the wheel with the largest pressure to a recording means.

5. The apparatus of claim 1 wherein the speciic gravity of the pig is greater than the specific gravity of the fluid flowing in the pipeline and the auctioneering circuit includes a switch means for connecting the lowermost measuring wheel to a recording means.

* * * * *